(12) United States Patent
Kunigita et al.

(10) Patent No.: US 9,078,047 B2
(45) Date of Patent: Jul. 7, 2015

(54) CONTENT REPRODUCTION DEVICE

(75) Inventors: Hisayuki Kunigita, Kanagawa (JP); Seung Hyun Lee, Seoul (KR); Ju Yeong Ji, Seoul (KR)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 144 days.

(21) Appl. No.: 13/579,657

(22) PCT Filed: Feb. 21, 2011

(86) PCT No.: PCT/JP2011/053665
§ 371 (c)(1),
(2), (4) Date: Aug. 17, 2012

(87) PCT Pub. No.: WO2011/102508
PCT Pub. Date: Aug. 25, 2011

(65) Prior Publication Data
US 2012/0311103 A1     Dec. 6, 2012

(30) Foreign Application Priority Data

Feb. 22, 2010   (JP) ................................. 2010-036601

(51) Int. Cl.
*G06F 15/16*   (2006.01)
*H04N 21/658*   (2011.01)
(Continued)

(52) U.S. Cl.
CPC ............ *H04N 21/6582* (2013.01); *H04L 27/14* (2013.01); *H04L 47/806* (2013.01);
(Continued)

(58) Field of Classification Search
CPC ......... H04L 27/12; H04L 27/14; H04L 67/14; H04L 47/806; G06F 17/40; G06F 17/30867; G06F 13/00; G06F 21/6218; H04N 13/0055; H04N 13/0059; H04N 21/4331; H04N 21/4334; H04N 21/4622

USPC ................................................... 709/227–229
See application file for complete search history.

(56) References Cited

U.S. PATENT DOCUMENTS 5,721,817 A * 2/1998 Kurihara et al. ............... 709/227
2004/0068572 A1 * 4/2004 Wu ............................. 709/229
(Continued)

FOREIGN PATENT DOCUMENTS

JP   2003174636 A * 6/2003
JP   2006100885 A    4/2006
(Continued)

OTHER PUBLICATIONS

Office Action for corresponding Japanese Patent Application No. 2012-500679, dated Jul. 8, 2013.
(Continued)

*Primary Examiner* — Hieu Hoang
(74) *Attorney, Agent, or Firm* — Matthew B. Dernier, Esq.; Gibson & Dernier LLP

(57) ABSTRACT

Provided is a content reproduction device which enables a user watching or listening to a content on a given content reproduction device to discontinue the watching thereof or listening thereto and then easily resume the watching of the same content or listening thereto from a discontinued state on another content reproduction device. When reproduction of a content is discontinued, discontinued state information indicating a reproduction state of the content at a time point of the discontinuation is transmitted to a watching/listening history management server (20) and the discontinued state information stored in the watching/listening history management server (20) is received from the watching/listening history management server (20), and the reproduction of the content is started from a state determined based on the received discontinued state information.

11 Claims, 4 Drawing Sheets

(51) Int. Cl.
| | |
|---|---|
| H04L 27/14 | (2006.01) |
| H04L 12/927 | (2013.01) |
| H04L 29/08 | (2006.01) |
| H04L 27/12 | (2006.01) |
| H04N 5/76 | (2006.01) |
| H04N 21/258 | (2011.01) |
| H04N 21/433 | (2011.01) |
| H04N 21/466 | (2011.01) |
| H04N 21/845 | (2011.01) |
| H04N 5/765 | (2006.01) |
| H04N 9/82 | (2006.01) |

(52) U.S. Cl.
CPC ............... *H04L 67/14* (2013.01); *H04L 27/12* (2013.01); *H04N 5/76* (2013.01); *H04N 5/765* (2013.01); *H04N 9/8205* (2013.01); *H04N 21/25808* (2013.01); *H04N 21/4333* (2013.01); *H04N 21/4667* (2013.01); *H04N 21/8455* (2013.01)

(56) References Cited

U.S. PATENT DOCUMENTS

| | | | |
|---|---|---|---|
| 2005/0166258 A1* | 7/2005 | Vasilevsky et al. | 725/138 |
| 2006/0233524 A1 | 10/2006 | Masuo | |
| 2008/0118232 A1 | 5/2008 | Kakumu | |
| 2008/0189365 A1* | 8/2008 | Narayanaswami et al. | 709/204 |
| 2009/0193086 A1* | 7/2009 | Lingafelt et al. | 709/206 |

FOREIGN PATENT DOCUMENTS

| | | |
|---|---|---|
| JP | 2008085934 A | 4/2008 |
| JP | 2010040124 A | 2/2010 |
| WO | 03067594 A1 | 8/2003 |
| WO | 2008047418 A1 | 4/2008 |

OTHER PUBLICATIONS

European Search Report for corresponding European Patent Application No. 11744794.6, dated Jul. 2, 2013.

Office Action for corresponding Japanese Patent Application No. 2012-500679, dated Apr. 2, 2013.

International Search Report for corresponding PCT/JP2011/053665, dated Mar. 15, 2011.

International Preliminary Report on Patentability and Written Opinion for corresponding PCT Application No. PCT/JP2011/053665, dated Sep. 18, 2012.

* cited by examiner

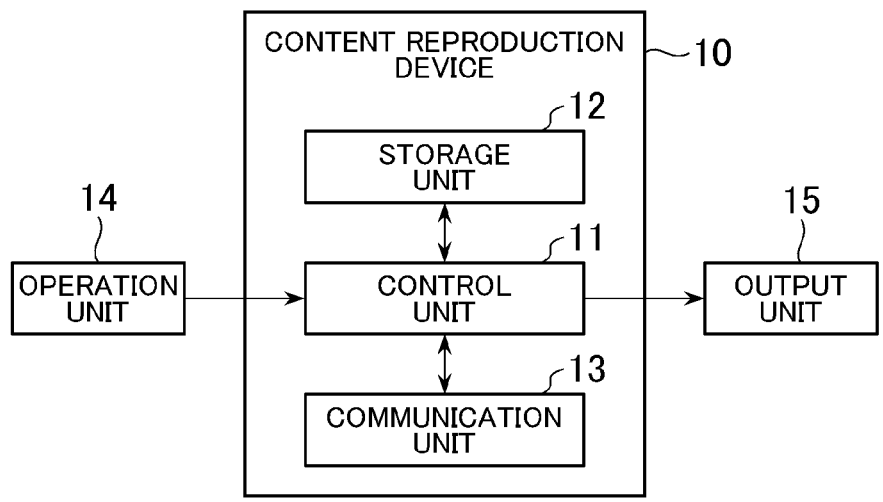
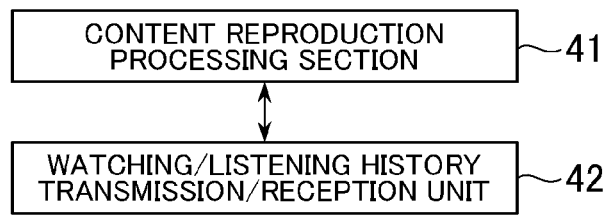
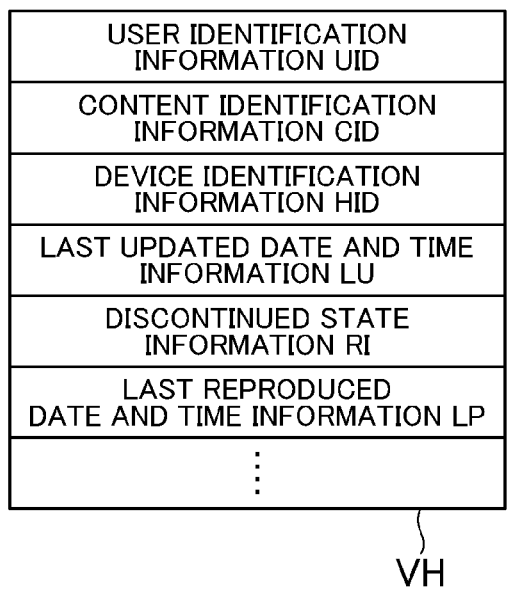

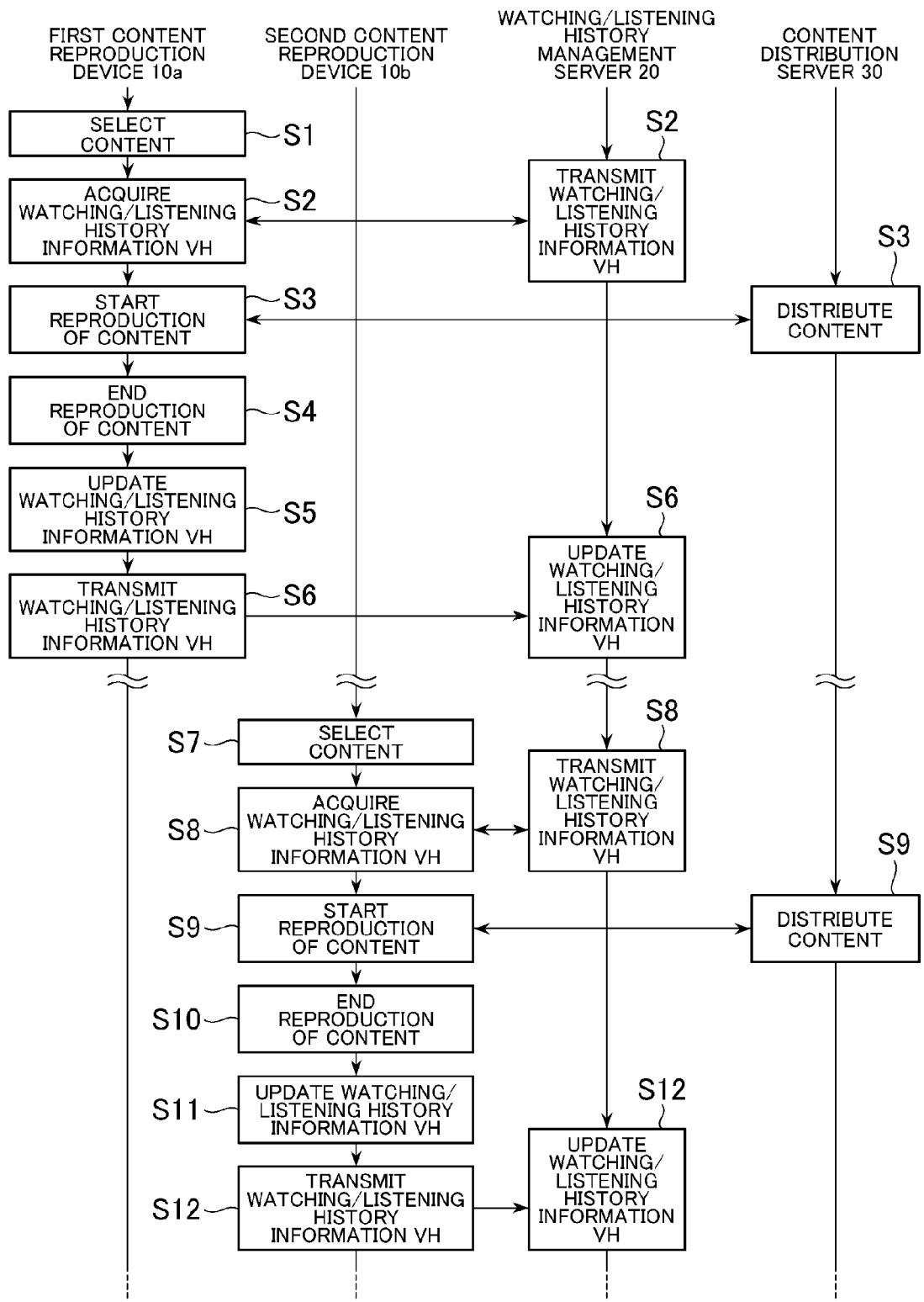

CONTENT REPRODUCTION DEVICE

TECHNICAL FIELD

The present invention relates to a content reproduction device that allows a user to watch or listen to various contents, a content reproduction system, a content reproduction method, and an information storage medium.

BACKGROUND ART

There are known various content reproduction devices that allow a user to watch or listen to contents including a moving image, a music track, a still image, and an electronic book. In recent years, miniaturization of devices and development of communications infrastructures have diversified situations in which users enjoy watching or listening to contents, for example, watching or listening to the contents outdoors by using portable content reproduction devices. Such content reproduction devices include ones that enable, in a case where the user has watched or listened to a content halfway and has discontinued the watching thereof or listening thereto, reproduction of the content to be started from a previously discontinued state in the subsequent reproduction thereof (see, for example, Patent Literature 1).

CITATION LIST

Patent Literature

Patent Literature 1: US 2008/118232 A1

SUMMARY OF THE INVENTION

Technical Problem

When using a plurality of content reproduction devices, a user watching or listening to a content halfway on one content reproduction device may wish to discontinue watching thereof or listening thereto and then resume the watching of the content or listening thereto from a discontinued state not on the same content reproduction device but on another content reproduction device. For example, the user may watch a moving image halfway outdoors by using a portable content reproduction device and then watch the rest thereof by using a stationary content reproduction device placed in a living room at home. In such a case, the user needs to remember up to which point the user has watched or listened to the content and manually seek the point (by fast forwarding or the like) in order to watch or listen to the remaining part of the content at home.

The present invention has been made in view of the above-mentioned circumstances, and it is an object of the invention to provide a content reproduction device, which enables a user watching or listening to a content on a given content reproduction device to discontinue the watching thereof or listening thereto and then easily resume the watching of the same content or listening thereto from a discontinued state on another content reproduction device, a content reproduction system, a content reproduction method, and an information storage medium.

Solution to Problem

According to the present invention, there is provided a content reproduction device, which is to be connected to a watching/listening history management server, including: content reproduction means for reproducing a content; discontinued state information transmission means for transmitting, when reproduction of the content is discontinued, discontinued state information indicating a reproduction state of the content at a time point of the discontinuation to the watching/listening history management server; and discontinued state information reception means for receiving the discontinued state information stored in the watching/listening history management server from the watching/listening history management server, in which the content reproduction means starts the reproduction of the content from a state determined based on the received discontinued state information.

In the above-mentioned content reproduction device, the discontinued state information transmission means may transmit the discontinued state information to the watching/listening history management server in association with identification information on a user of the content reproduction device, and the discontinued state information reception means may receive the discontinued state information associated with the identification information on the user of the content reproduction device from the watching/listening history management server.

Further, the discontinued state information reception means may receive a plurality of pieces of the discontinued state information, which are stored in the watching/listening history management server and which are common in the user and the content, from the watching/listening history management server, and the content reproduction means may start the reproduction of the content from a state determined based on a piece of the discontinued state information selected from among the received plurality of pieces of the discontinued state information.

Further, the content reproduction means may present, to the user as options, a plurality of pieces of the discontinued state information selected from among the received plurality of pieces of the discontinued state information based on a predetermined selection condition, and start the reproduction of the content from a state determined based on a piece of the discontinued state information selected from among the options presented to the user.

Further, the discontinued state information transmission means may transmit the discontinued state information to the watching/listening history management server in association with identification information on the content reproduction device, and the content reproduction means may present, as one of the options, each of a plurality of pieces of the discontinued state information associated with mutually different pieces of identification information on content reproduction devices among the received plurality of pieces of the discontinued state information.

Further, the content reproduction means may select, as one of the options, a piece of the discontinued state information corresponding to the reproduction of the content last executed by the content reproduction means, which is used as the predetermined selection condition.

Further, the content reproduction means may select, as one of the options, a piece of the discontinued state information corresponding to the reproduction of the content which is last executed, from among the received plurality of pieces of the discontinued state information, which is used as the predetermined selection condition.

Further, the content may be time-series data that is sequentially reproduced from a starting position to an end position with a lapse of time, and the content reproduction means may selects, as one of the options, a piece of the discontinued state information indicating that the content was reproduced up to a position farthest from the starting position from among the received plurality of pieces of the discontinued state information, which is used as the predetermined selection condition.

Further, according to the present invention, there is provided a content reproduction system, including: a plurality of content reproduction devices; and a watching/listening history management server, in which: each of the plurality of content reproduction devices may include: content reproduction means for reproducing a content; and discontinued state information transmission means for transmitting, when reproduction of the content is discontinued, discontinued state information indicating a reproduction state of the content at a time point of the discontinuation to the watching/listening history management server; the watching/listening history management server may include storage means for storing the discontinued state information received from the each of the plurality of content reproduction devices; the each of the plurality of content reproduction devices may further include discontinued state information reception means for receiving the discontinued state information from the watching/listening history management server; and the content reproduction means may start the reproduction of the content from a state determined based on the received discontinued state information.

Further, according to the present invention, there is provided a content reproduction method, which uses a content reproduction device to be connected to a watching/listening history management server, including the steps of: reproducing a content; transmitting, when reproduction of the content is discontinued, discontinued state information indicating a reproduction state of the content at a time point of the discontinuation to the watching/listening history management server; and receiving the discontinued state information stored in the watching/listening history management server from the watching/listening history management server, in which the step of reproducing a content includes starting the reproduction of the content from a state determined based on the received discontinued state information.

Further, according to the present invention, there is provided a computer-readable information storage medium having a program stored thereon for causing a computer to be connected to a watching/listening history management server to function as: content reproduction means for reproducing a content; discontinued state information transmission means for transmitting, when reproduction of the content is discontinued, discontinued state information indicating a reproduction state of the content at a time point of the discontinuation to the watching/listening history management server; and discontinued state information reception means for receiving the discontinued state information stored in the watching/listening history management server from the watching/listening history management server, in which the content reproduction means starts the reproduction of the content from a state determined based on the received discontinued state information.

BRIEF DESCRIPTION OF DRAWINGS

FIG. 2 A configuration diagram of a content reproduction device according to the embodiment of the present invention.

FIG. 3 A functional block diagram illustrating functions of the content reproduction device according to the embodiment of the present invention.

FIG. 4 A diagram schematically illustrating details of watching/listening history information.

FIG. 5 A flowchart illustrating an example of a flow of processing executed by the content reproduction system according to the embodiment of the present invention.

DESCRIPTION OF EMBODIMENT

Hereinafter, an embodiment of the present invention is described in detail with reference to the accompanying drawings.

Figure 1:
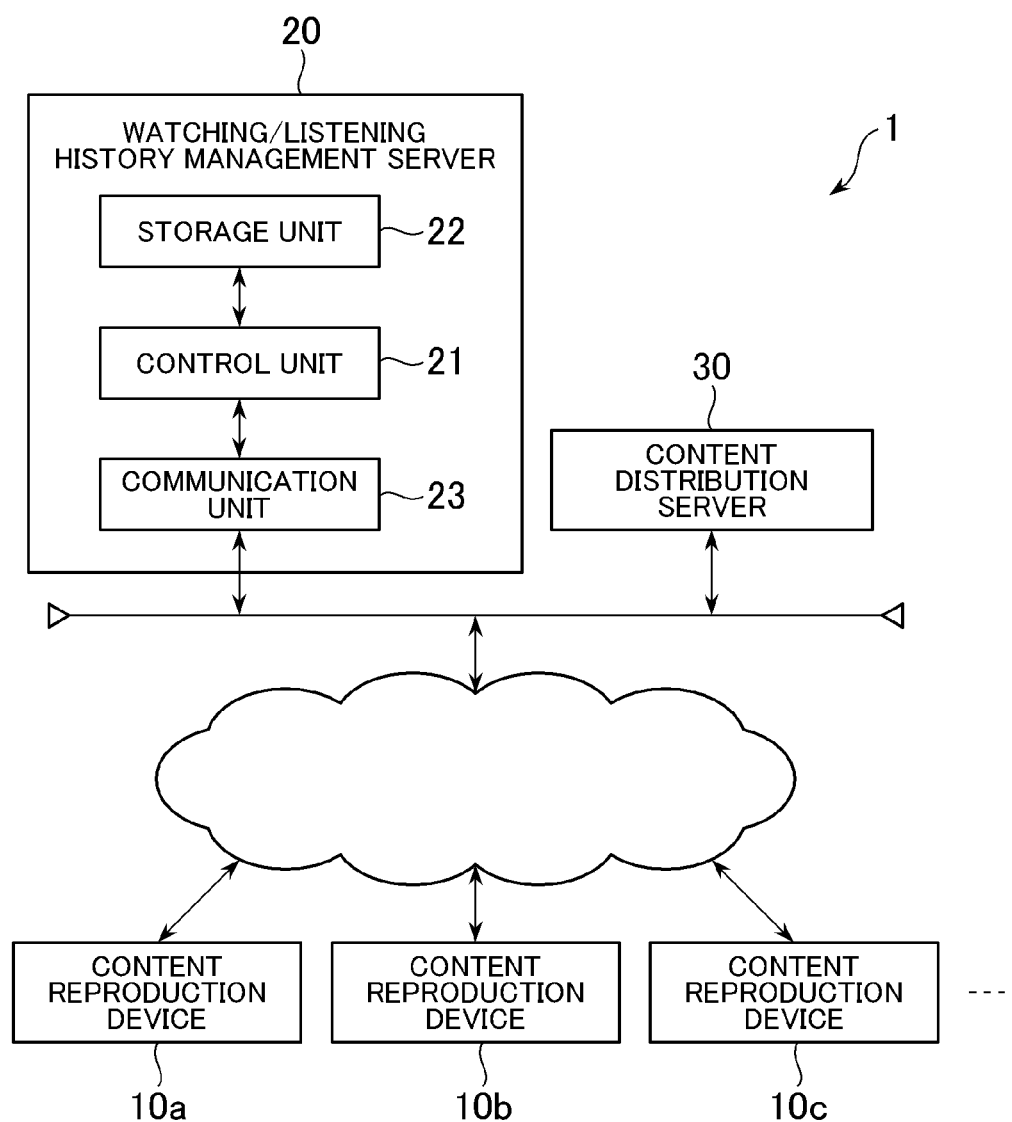
FIG. 1 A schematic diagram of a content reproduction system according to an embodiment of the present invention.

FIG. 1 is a schematic diagram illustrating an overview of a content reproduction system 1 according to one embodiment of the present invention. The content reproduction system 1 includes a plurality of content reproduction devices 10 and a watching/listening history management server 20. Further, in this embodiment, the content reproduction system 1 includes a content distribution server 30.

The content reproduction device 10 is an information processing apparatus used by a user to watch or listen to various contents, and may include various stationary content reproduction devices such as a consumer game machine, a desktop personal computer, a video recorder, and a home-use television set. Further, the content reproduction device 10 may include various portable content reproduction devices such as a portable game machine, a personal digital assistant, a music player, and an electronic book reader. Note that, in this embodiment, contents to be reproduced by the content reproduction device 10 may include various types such as a moving image, a still image, audio data, and an electronic book.

FIG. 2 is a configuration block diagram illustrating a configuration of the content reproduction device 10. As illustrated in FIG. 2, the content reproduction device 10 includes a control unit 11, a storage unit 12, and a communication unit 13. Further, the content reproduction device 10 is connected to an operation unit 14 and an output unit 15.

The control unit 11 is a program control device such as a central processing unit (CPU) and executes various types of information processing in accordance with programs stored in the storage unit 12. The storage unit 12 includes a memory element such as a RAM or a ROM, and stores the programs executed by the control unit 11 and data to be processed by the programs. In particular, in this embodiment, the storage unit 12 temporarily stores data of the content to be reproduced by the content reproduction device 10. The storage unit 12 also functions as a work memory for the control unit 11.

The communication unit 13 is an interface for communicating data with another apparatus via the communication network, and the content reproduction device 10 transmits and receives information to and from the watching/listening history management server 20 and the content distribution server 30 via the communication unit 13. Note that, the content reproduction device 10 may be connected to the watching/listening history management server 20 and the content distribution server 30 via various communication networks such as the Internet, a local area network, and a wireless communication network.

The operation unit 14 is a device for receiving operational input from the user and may include a keyboard, a mouse, or a remote controller, for example. Further, the operation unit 14 may include an operation member provided on a front surface of a casing of the content reproduction device 10, such as an operation button or a switch. The user makes an operation on the operation unit 14 to select a content to be reproduced or provide an instruction to start or stop reproducing the content with respect to the content reproduction device 10.

The output unit 15 is a device for outputting details of a content to be reproduced by the content reproduction device 10. Specifically, if the content is a moving image, a still image, or an electronic book, the output unit 15 may be a display device for displaying the details of the content. If the content is audio data, the output unit 15 may be an audio output device such as headphones or a loudspeaker. Further, the output unit 15 may include both the display device and the audio output device. Note that, as with the operation unit 14, the output unit 15 may also be formed integrally with the casing of the content reproduction device 10.

Three types of content as described below can be included in the contents to be reproduced by the content reproduction device 10.

The content of a first type is time-series data (stream data) including details that change over time, such as a moving image and audio data. The time-series data of this kind generally has a reproduction time set in advance, and is sequentially reproduced from a starting position to an end position with a lapse of time.

The content of a second type is spatial data expressing details that are spatially extended two-dimensionally or three-dimensionally, such as a still image. The details of such spatial data are expressed by a pixel value of each position within a two-dimensional plane or a shape and an orientation of an object disposed in each position within a three-dimensional space. The content reproduction device 10 displays the details of such spatial data as an image on a display device. In this case, in response to an instruction from the user, the content reproduction device 10 may display only a specific range on which the user focuses attention within the spatial data or enlarge and display a specific part.

The content of a third type is array data including a plurality of contents arranged in an order set in advance as a component. For example, an electronic book is the array data including a plurality of page data (text data or image data) items each expressing one page of a book in the order set in advance. Further, for example, a content such as a drama series formed of moving images of a plurality of episodes is also a kind of array data. Those array data items are normally reproduced in the order set in advance. A reproduction method for a content of this type may include a case of finishing reproduction of one content included in the array data and then automatically starting reproduction of the subsequent content or a case of waiting for the instruction from the user before starting the reproduction of the subsequent content.

Note that, the contents to be reproduced by the content reproduction device 10 according to this embodiment are not limited to the types described above. For example, the content reproduction device 10 may reproduce a game content. In this case, the game content is formed of a picture and audio that progress over time in the same manner as the time-series data, but details thereof change depending on details of an operation input performed by the user.

The watching/listening history management server 20 is an information processing apparatus such as a server computer, and manages a watching/listening history of the contents reproduced by the respective content reproduction devices 10. Specifically, the watching/listening history management server 20 stores the watching/listening history received from each of the content reproduction devices 10, and transmits details thereof to another content reproduction device 10 at a predetermined timing. Through the intermediation of the watching/listening history management server 20, the plurality of content reproduction devices 10 belonging to the content reproduction system 1 can share the watching/listening history with one another without directly establishing a communication connection.

As illustrated in FIG. 1, the watching/listening history management server 20 includes a control unit 21, a storage unit 22, and a communication unit 23.

The control unit 21 is a program control device such as a CPU, and executes various kinds of information processing in accordance with a program stored in the storage unit 22. The storage unit 22 includes a memory device such as a RAM or a ROM and a disk device such as a hard disk drive, and stores the program executed by the control unit 21 and data to be processed by the program. In particular, in this embodiment, the storage unit 22 stores watching/listening history information on the contents to be managed. The storage unit 22 also functions as a work memory for the control unit 21.

The communication unit 23 is an interface for exchanging data with another apparatus via the communication network, and the watching/listening history management server 20 transmits and receives information to and from each content reproduction device 10 via the communication unit 23.

The content distribution server 30 is an information processing apparatus such as a server computer, stores the contents to be reproduced by the respective content reproduction devices 10, and distributes the contents in response to a request from each content reproduction device 10. The content distribution server 30 may perform a streaming distribution (real-time distribution) of the time-series data with respect to each content reproduction device 10, or may cause the content reproduction device 10 to download the various contents including the time-series data.

Hereinafter, a description is made of functions realized by the content reproduction device 10 in this embodiment. FIG. 3 is a functional block diagram illustrating the functions realized by the content reproduction device 10. As illustrated in FIG. 3, the content reproduction device 10 includes a content reproduction processing section 41 and a watching/listening history transmission/reception unit 42. Those functions are realized by the control unit 11 executing the program stored in the storage unit 12. This program may be provided by, for example, being stored in various computer-readable information storage media including an optical disc. Alternatively, the program may be provided via the communication network such as the Internet.

The content reproduction processing section 41 performs reproduction processing for a content selected by the user. Specifically, first, the content reproduction processing section 41 receives a selection of the content to be reproduced from the user. In other words, the content reproduction processing section 41 presents contents that are previously downloaded from the content distribution server 30 and stored within the content reproduction device 10, contents that can be distributed by the content distribution server 30, contents that are stored on a medium such as a memory card inserted into a medium reading unit (not shown) built into the content reproduction device 10, and the like, to the user as options for the contents to be reproduced. Then, the content reproduction processing section 41 receives from the user an operation for a content selection with respect to the operation unit 14.

Further, upon reception of a content reproduction start instruction from the user, the content reproduction processing section 41 starts the reproduction processing for the selected content. Note that, the content reproduction processing section 41 may start the reproduction processing for the content immediately at a time point when receiving the above-mentioned operation for the content selection. With this operation, the content selected by the user is reproduced from the output unit 15. Further, the content reproduction processing section 41 discontinues the reproduction processing for the content if a discontinuation instruction issued by the user through the operation unit 14 is received halfway through the reproduction of the content. At this time, the content reproduction processing section 41 outputs information indicating a reproduction state of the content at a time point when the reproduction processing for the content was discontinued (hereinafter, referred to as "discontinued state information RI") to the watching/listening history transmission/reception unit 42.

Prior to execution of the reproduction processing for the content performed by the content reproduction processing section 41, the watching/listening history transmission/reception unit 42 receives information related to the user's past watching/listening history of the content ready to be reproduced (hereinafter, referred to as "watching/listening history information VH") from the watching/listening history management server 20. Further, after the content reproduction processing section 41 executes the reproduction processing for the content, the watching/listening history transmission/reception unit 42 transmits the watching/listening history information VH that reflects an execution result of the reproduction processing to the watching/listening history management server 20. The watching/listening history management server 20 stores the watching/listening history information VH received from each content reproduction device 10 in the storage unit 22 and performs management thereof.

Here, a description is made of details of the watching/listening history information VH on the content managed by the watching/listening history management server 20. FIG. 4 is a diagram schematically illustrating details included in the watching/listening history information VH. As illustrated in FIG. 4, the watching/listening history information VH on the content includes user identification information UID for identifying the user who has watched or listened to the content, content identification information CID for identifying the content, device identification information HID for identifying the content reproduction device 10 on which the user last reproduced the content, and last updated date and time information LU indicating a timing at which the watching/listening history information VH was last updated. In addition, the watching/listening history information VH includes the above-mentioned discontinued state information RI. Further, the watching/listening history information VH may include information indicating a status in which the user has watched or listened to the content so far (including a total number of times that the content has been reproduced, a timing at which the content was first watched or listened to, and a timing at which the content was last watched or listened to). Note that, information indicating a timing at which the content was last watched or listened to may be information indicating the timing at which the content reproduction processing performed by the content reproduction processing section 41 was last ended normally, and may be information indicating a timing at which, in a case where the content is the time-series data or the array data, the user watched or listened to the content to the last (up to the end position of the time-series data or the last component included in the array data). In the following description, information on the date and time at which the reproduction processing for the content last ended is referred to as "last reproduced date and time information LP" irrespective of whether or not the user has watched or listened to the entire content to the last.

The device identification information HID is information for uniquely identifying each of the content reproduction devices 10, which is previously stored within the storage unit 12 of the content reproduction device 10. Further, the user identification information UID is used for uniquely identifying each of a plurality of users who use the content reproduction system 1 according to this embodiment, and is assigned to each user by, for example, the watching/listening history management server 20 or a user management server (not shown) different therefrom. Each user registers the user identification information UID previously assigned to himself/herself on the content reproduction device 10 used by himself/herself, and has the user identification information UID stored in the storage unit 12. In a case where one user uses the plurality of content reproduction devices 10, the user registers his/her own user identification information UID on the respective content reproduction devices 10 that are used by himself/herself. Accordingly, no matter which of the content reproduction devices 10 is used by the user to watch or listen to the content, the content reproduction devices 10 each generate the watching/listening history information VH including the same user identification information UID. Note that, one content reproduction device 10 may be used by a plurality of users. In this case, respective pieces of the user identification information UID corresponding to the plurality of users are registered on one content reproduction device 10. Then, to watch or listen to the content by using the content reproduction device 10, each user first selects his/her own user identification information UID from among a plurality of pieces of the user identification information UID that are registered on the content reproduction device 10. This allows the watching/listening history transmission/reception unit 42 to identify the user who has watched or listened to the content by using the content reproduction device 10 and generate the watching/listening history information VH including the user identification information UID of the identified user.

Further, the content identification information CID is information for identifying each of the contents watched or listened to by the content reproduction system 1. For example, the content identification information CID is assigned to a content by a distributor of the content and distributed from the content distribution server 30 along with data indicating details of the content. Further, if the content is not the one distributed by the content distribution server 30 but one that has been created or imported into the content reproduction device 10 by the user, the content identification information CID may be assigned to the content by the content reproduction device 10. In this case, each content is identified by combining the device identification information HID on the content reproduction device 10 and the content identification information CID issued by the content reproduction device 10. Alternatively, the content reproduction device 10 may temporarily upload such a content prepared by the user onto a disk space for a personal user which is secured on the content distribution server 30 or the like. With this configuration, not only the content prepared from the beginning as a content for distribution by the content distribution server 30 but also a content prepared by each user can be assigned the content identification information CID by the content distribution server 30 and can be distributed to another content reproduction device 10. Further, the content identification information CID may be information, such as, for example, a hash value, which is generated from details of data on the content based on a predetermined algorithm (such as MD5). In this case, if the respective content reproduction devices 10 and the content distribution server 30 calculate the hash value based on the same algorithm, the respective content reproduction devices 10 and the distribution server 30 can assign the same content identification information CID to the same content independently of one another.

As described above, the discontinued state information RI is the information indicating, in a case where the reproduction processing for the content performed by the content reproduction processing section 41 has been discontinued, the reproduction state of the content at the time point of the discontinuation. Note that, if the reproduction of the content has been executed to the last without being discontinued, the discontinued state information RI may include information indicating that the reproduction of the content has been completed to the last, instead of the information indicating the reproduction state at the time point of the discontinuation.

Specifically, in the case where the content is the time-series data such as a moving image and audio, the discontinued state information RI includes information indicating a timing itself at which the reproduction of the content was discontinued. For example, the discontinued state information RI of the time-series data may be information indicating the reproduction time that has elapsed from the starting position to the time point of the discontinuation. Further, in the case where the content is the moving image formed of a plurality of frame images, the discontinued state information RI may be information indicating a number (frame number) obtained by counting up the frame images that were displayed up to the time point of the discontinuation from a starting frame image. Note that, depending on the content, there may exist a plurality of content data items generated from the same content in a plurality of data formats. For example, in the case of the moving image, two types of data format for high resolution and low resolution (or three or more types different from one another in resolution) may be prepared for one content. In this case, there is a possibility that even the same content may exhibit a difference in the reproduction time among data formats due to a difference in optional data or the like added to the respective data items (for example, moving image representing a commercial message). In such a case, it is desired that information indicating the details of a content that was being reproduced at the time point of the discontinuation independently of the difference in the data format be used as the discontinued state information RI. Specifically, information indicating the reproduction time of a body of the content excluding the optional data added to the respective data items or information indicating the frame number of the body of the content may be set as the discontinued state information RI.

In the case where the content is the spatial data such as a still image, the discontinued state information RI may include position coordinate information indicating which position within the still image was used as a center in displaying the image at the time point of the discontinuation or information indicating a magnification of which level was used to display the still image.

In the case where the content is the array data such as an electronic book, the discontinued state information RI includes information indicating what number component was being reproduced among a plurality of components included in the array data. In addition, the discontinued state information RI may include information indicating the reproduction state of the component that was being reproduced at the time point of the discontinuation, which was obtained at the time point of the discontinuation in the same manner as in the above-mentioned cases of the time-series data or the spatial data. As a specific example, in the case where the content is the electronic book, the discontinued state information RI includes information indicating a section such as a chapter or a paragraph that was being watched by the user at the time of the discontinuation or information indicating a page number of a page that was being watched by the user. In addition, the discontinued state information RI may include the position coordinate information and magnification information that indicate which part of the page image identified by such information was being enlarged and displayed at a magnification of which level. Further, in a case where the user views each page image by scrolling or by moving a cursor, the discontinued state information RI may include information indicating a scroll amount, a cursor position, a line number, and the like obtained at the time point of the discontinuation (in other words, information regarding which position within one page the user viewed the page up to).

Further, in the case where the content is the game content, the discontinued state information RI may be information indicating the progress of a game generated by a game program serving as the content reproduction processing section 41.

Next, a description is made of details of processing performed by the watching/listening history transmission/reception unit 42. In this embodiment, in a case where the user watches or listens to a content by using the content reproduction device 10, the watching/listening history transmission/reception unit 42 previously acquires, from the watching/listening history management server 20, the watching/listening history information VH indicating the user's past watching/listening history of the content. Note that, in a case where such watching/listening history information VH cannot be acquired (such as case where the user watches or listens to the content for the first time), the watching/listening history transmission/reception unit 42 may generate the watching/listening history information VH including a default value.

After that, when content reproduction processing is performed by the content reproduction processing section 41, the watching/listening history transmission/reception unit 42 performs updating processing for reflecting a result of the content reproduction processing on the watching/listening history information VH that has been acquired. In other words, the watching/listening history transmission/reception unit 42 overwrites the device identification information HID included in the watching/listening history information VH with its own device identification information HID, and also overwrites the last updated date and time information LU with date and time information indicating an execution time point of the updating processing (in other words, time point when the reproduction processing for the content ended). Further, the watching/listening history transmission/reception unit 42 replaces the discontinued state information RI by information indicating the reproduction state obtained when the current content reproduction processing was discontinued, which is received from the content reproduction processing section 41. In addition, in a case where the watching/listening history information VH includes information such as the past number of times of the reproduction, such an update as to add 1 thereto may be performed. After that, the watching/listening history transmission/reception unit 42 transmits the updated watching/listening history information VH to the watching/listening history management server 20. Note that, here, the last updated date and time information LU is set as the information indicating the timing at which the watching/listening history information VH was updated within the content reproduction device 10, but the last updated date and time information LU may be information indicating a timing at which the watching/listening history information VH was updated within the watching/listening history management server 20. In this case, the content reproduction device 10 does not update the last updated date and time information LU. Instead thereof, the watching/listening history management server 20 is configured to receive the watching/listening history information VH from the content reproduction device 10, and when updating the watching/listening history information VH stored in itself into the received watching/listening history information VH, update the last updated date and time information LU within the watching/listening history information VH into the date and time information at the updated time point.

Note that, the watching/listening history transmission/reception unit 42 may transmit an acquisition request for the watching/listening history information VH on a specified content to the watching/listening history management server 20 automatically (without depending on the instruction from the user) at the time point when the content reproduction processing section 41 receives an instruction to start the reproduction from the user, and may receive the watching/listening history information VH from the watching/listening history management server 20. Further, while the user is using the content reproduction device 10, the watching/listening history transmission/reception unit 42 may access the watching/listening history management server 20 at regular intervals to query whether or not information that has not been acquired yet (in other words, watching/listening history information VH transmitted from another content reproduction device 10 to the watching/listening history management server 20 after the previous access) is left in the watching/listening history information VH related to the user, and may acquire the information that has not been acquired if the information is left. Alternatively, after an explicit instruction to acquire the watching/listening history information VH is received from the user, the watching/listening history transmission/reception unit 42 may access the watching/listening history management server 20 to acquire the watching/listening history information VH that has not been acquired. In this case, the watching/listening history transmission/reception unit 42 may acquire the watching/listening history information VH regarding all the contents including the user identification information UID on the user, or may acquire only the watching/listening history information VH including the content identification information CID on the content specified by the user.

Further, the watching/listening history transmission/reception unit 42 may update the watching/listening history information VH on the content immediately at the time point when the content reproduction processing section 41 ends the reproduction processing for the content, and may automatically transmit the updated watching/listening history information VH to the watching/listening history management server 20. Further, the watching/listening history transmission/reception unit 42 may access the watching/listening history management server 20 at regular intervals and transmit the watching/listening history information VH updated so far to the watching/listening history management server 20. In addition, the watching/listening history transmission/reception unit 42 may transmit the updated watching/listening history information VH to the watching/listening history management server 20 after receiving the explicit instruction to transmit the watching/listening history information VH from the user.

Further, in this embodiment, in order to reproduce the content that has been watched or listened to by the user in the past, the content reproduction processing section 41 starts the reproduction of the content from a state determined based on the discontinued state information RI included in the watching/listening history information VH received from the watching/listening history management server 20. In other words, the content reproduction processing section 41 references the discontinued state information RI, which is included in the watching/listening history information VH received by the watching/listening history transmission/reception unit 42 prior to the content reproduction processing, to start the reproduction processing for the content from a state corresponding to the state indicated by the discontinued state information RI (in other words, reproduction state at the time point when the previous content reproduction was discontinued). Note that, the state at the time when the content reproduction processing section 41 starts the reproduction of the content may not necessarily be the reproduction state itself at the time point when content reproduction was discontinued in the past and, for example, may be a reproduction state that precedes the time point of the discontinuation by a predetermined time (for example, 30 seconds).

For example, in the case where the content to be reproduced is the time-series data, the content reproduction processing section 41 starts the reproduction of the remaining part of the content from a timing indicated by the discontinued state information RI or a timing that precedes the timing indicated by the discontinued state information RI by a predetermined time. In particular, in a case of reproducing the content by receiving the streaming distribution from the content distribution server 30, the content reproduction processing section 41 requests the content distribution server 30 to distribute the remaining part from the timing determined based on the discontinued state information RI. This allows, if the watching of the moving image and audio or listening thereto is previously discontinued halfway, the user to watch or listen to the same content from the discontinued point.

In the case where the content to be reproduced is the spatial data, the content reproduction processing section 41 performs display of the content in the same display manner as a display manner (display position and magnification) of the image that was being viewed by the user at the time of the discontinuation, which is indicated by the discontinued state information RI. Further, in the case where the content to be reproduced is the array data formed of a plurality of components, the content reproduction processing section 41 reproduces the component that was being reproduced at the time of the previous discontinuation in the same state as the reproduction state at the time of the previous discontinuation.

Such processing allows the user to discontinue the watching of the content or listening thereto halfway and then resume the watching of the content or listening thereto from the state corresponding to the state at the time of the previous discontinuation. In addition, in this embodiment, the discontinued state information RI is transmitted to the watching/listening history management server 20 as a part of the watching/listening history information VH in association with not only the content identification information CID but also the user identification information UID. Then, the watching/listening history information VH is also transmitted from the watching/listening history management server 20 to another content reproduction device 10 used by the same user. Therefore, the user is also allowed to, for example, watch or listen to the content halfway on the stationary content reproduction device 10 and then watch or listen to the remaining part of the content on another portable content reproduction device 10. In addition, the watching/listening history information VH generated as a result of performing the watching or listening on the portable content reproduction device 10 can also be transmitted to the stationary content reproduction device 10 via the watching/listening history management server 20 in the same manner. Therefore, the user is also allowed to watch or listen to the remaining part of the content that was watched or listened to halfway on the portable content reproduction device 10, on the stationary content reproduction device 10 in the same manner.

Hereinafter, referring to the flowchart of FIG. 5, a description is made of a specific example of a flow of processing executed by the content reproduction system 1 according to this embodiment. In the following description, it is assumed that two content reproduction devices 10 used by one user U1 are included in the content reproduction system 1 in which, of those content reproduction devices 10, the content reproduction device 10 used first by the user U1 is set as a first content reproduction device 10a and the content reproduction device 10 used subsequently by the user U1 is set as a second content reproduction device 10b. Further, it is assumed that the user U1 watches a content C1 of the moving image distributed by the content distribution server 30.

First, the first content reproduction device 10a receives a selection instruction for the content from the user U1 (S1). Subsequently, the watching/listening history transmission/reception unit 42 of the first content reproduction device 10a transmits a watching/listening history acquisition request including the user identification information UID of the user U1 and the content identification information CID of the content C1 selected in Step S1 to the watching/listening history management server 20, and acquires the watching/listening history information VH corresponding to the user identification information UID and the content identification information CID from the watching/listening history management server 20 (S2). With this operation, the watching/listening history information VH is synchronized between the first content reproduction device 10a and the watching/listening history management server 20. Note that, if the details of the watching/listening history information VH stored in the watching/listening history management server 20 are the same as the watching/listening history information VH retained in the first content reproduction device 10a (that is, the watching/listening history information VH has not been updated on the watching/listening history management server 20 since the watching/listening history information VH was last synchronized between the first content reproduction device 10a and the watching/listening history management server 20), the watching/listening history management server 20 does not need to transmit the watching/listening history information VH to the first content reproduction device 10a.

Figure 6A:
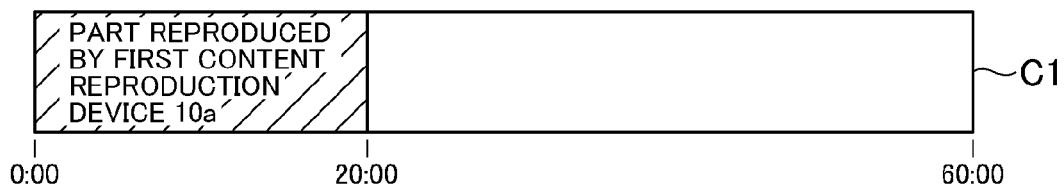
FIG. 6A A diagram illustrating an example of a part of a content reproduced by a first content reproduction device.

Subsequently, the content reproduction processing section 41 of the first content reproduction device 10a requests the content distribution server 30 to distribute the content C1 and starts the reproduction processing of the content C1 (S3). At this time, if the watching/listening history information VH acquired in Step S2 includes the discontinued state information RI, the content reproduction processing section 41 starts the reproduction processing of the content C1 from a discontinued state indicated by the discontinued state information RI. Here, it is assumed that the content reproduction processing section 41 reproduces the content C1 from the starting position and ends the content reproduction processing halfway in response to the discontinuation instruction from the user (S4). FIG. 6A is a schematic diagram illustrating an example of a part of the content C1 reproduced by the first content reproduction device 10a in the case where the reproduction of the content is thus discontinued. FIG. 6A indicates that an overall reproduction time of the content C1 is sixty minutes, a part corresponding to the first twenty minutes thereof was reproduced by the first content reproduction device 10a, and then the reproduction processing was discontinued.

In this case, the watching/listening history transmission/reception unit 42 performs the updating processing for overwriting the discontinued state information RI included in the watching/listening history information VH acquired in Step S2 with the discontinued state information RI indicating the reproduction state discontinued in Step S4 (S5), and transmits the updated watching/listening history information VH to the watching/listening history management server 20 (S6). In response thereto, the watching/listening history management server 20 updates the details of the watching/listening history information VH transmitted to the first content reproduction device 10a in Step S2 into the details of the watching/listening history information VH received in Step S6. In other words, the watching/listening history information VH is again synchronized between the first content reproduction device 10a and the watching/listening history management server 20. With this, the watching of the content or listening thereto performed by the user U1 using the first content reproduction device 10a is temporarily brought to an end.

After that, the user U1 uses the second content reproduction device 10b to watch or listen to the rest of the content C1 that was reproduced by the first content reproduction device 10a. At this time, the second content reproduction device 10b first receives a selection instruction to select the content C1 from the user U1 (S7). Subsequently, the watching/listening history transmission/reception unit 42 of the second content reproduction device 10b transmits the watching/listening history acquisition request for the selected content C1 to the watching/listening history management server 20, and acquires the watching/listening history information VH (S8). At this time, the user identification information UID of the user U1 and the content identification information CID of the selected content C1 included in the watching/listening history acquisition request are the same as those transmitted from the first content reproduction device 10a in Step S2. Therefore, the watching/listening history management server transmits the watching/listening history information VH reflecting a content reproduction result from the first content reproduction device 10a, which is updated in the above-mentioned processing of Step S6.

Subsequently, the content reproduction processing section 41 of the second content reproduction device 10b references the discontinued state information RI included in the watching/listening history information VH received in Step S8 to identify the reproduction state at the time of the discontinuation in Step S4, and requests the content distribution server 30 to distribute the content C1 of the remaining part in that state. Therefore, the second content reproduction device 10b executes the reproduction of the content C1 from a point subsequent to the part that was reproduced on the first content reproduction device 10a (S9). In the example of FIG. 6A, the reproduction of the content C1 is started from a point corresponding to the time point when twenty minutes have elapsed from the starting position.

Figure 6B:
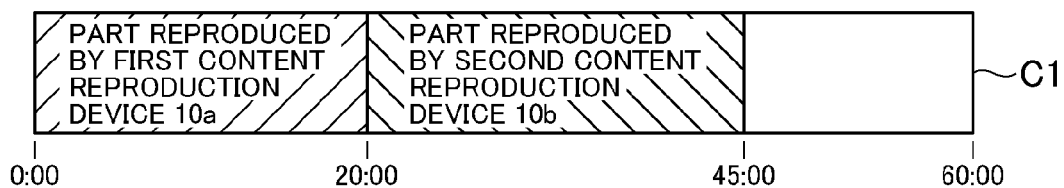
FIG. 6B A diagram illustrating an example of a part of a content reproduced by a second content reproduction device.

After that, when the reproduction processing of the content C1 ends (S10), in the same manner as in the case of the first content reproduction device 10a, the watching/listening history transmission/reception unit 42 updates the watching/listening history information VH acquired in Step S8 (S11), and transmits the updated watching/listening history information VH to the watching/listening history management server 20 (S12). With this operation, the watching/listening history information VH on the content C1 regarding the user U1 recorded in the watching/listening history management server 20 is updated into the watching/listening history information VH that reflects the result of the content reproduction processing performed by the second content reproduction device 10b. FIG. 6B is a schematic diagram indicating that the remaining part of the content C1 was reproduced by the second content reproduction device 10b from the state illustrated in FIG. 6A. Note that, in the example of FIG. 6B, the second content reproduction device 10b executed the reproduction processing of the content C1 for twenty-five minutes, and then discontinued the reproduction processing of the content. Accordingly, the watching/listening history information VH updated in Step S11 includes the discontinued state information RI indicating that the reproduction processing was discontinued at the time point when forty-five minutes (total value of twenty minutes for the reproduction on the first content reproduction device 10a and twenty-five minutes for the reproduction on the second content reproduction device 10b) had elapsed from the starting position. Having received the watching/listening history information VH from the watching/listening history management server 20, in reproducing the content C1 next time, the first content reproduction device 10a starts the reproduction of the content C1 from a point subsequent to the time point when forty-five minutes have elapsed from the starting position (in other words, time point when the user U1 discontinued the watching or listening on the second content reproduction device 10b).

[Version Management for Watching/Listening History]

Next, a description is made of an example of processing for a case of performing version management for the watching/listening history information VH. In the above description, the watching/listening history information VH managed by the watching/listening history management server 20 is managed with a combination of the user identification information UID and the content identification information CID as a key. In other words, even the watching/listening histories of the same content, if having different pieces of the user identification information UID, are recorded in the watching/listening history management server 20 as mutually different pieces of the watching/listening history information VH, and even the watching/listening histories of the same user, if having different pieces of the content identification information CID, are recorded in the watching/listening history management server 20 as different pieces of the watching/listening history information VH. Meanwhile, if both the content to be reproduced and the user who has watched or listened to the content are common even when the content was reproduced on the different content reproduction devices 10, the watching/listening history management server 20 regards the watching/listening history as the same and as a subject to be overwritten. As a result, only one piece of the watching/listening history information VH is stored in the watching/listening history management server 20 for each combination of the user identification information UID and the content identification information CID, and the watching/listening history information VH is updated when the content corresponding to the content identification information CID is watched or listened to by the user corresponding to the user identification information UID on any one of the plurality of content reproduction devices 10.

However, each content reproduction device 10 is not always capable of establishing a communication connection to the watching/listening history management server 20. For example, if the user executes the reproduction processing for the content on the road by using the portable content reproduction device 10a, the watching/listening history information VH reflecting the result of the content reproduction processing cannot be immediately transmitted to the watching/listening history management server 20 in some cases depending on the communication environment. If the user executes the reproduction processing for the same content by using the other content reproduction device 10b in such a status, a different piece of the watching/listening history information VH is generated by the content reproduction device 10b before the result of the content reproduction processing obtained by the content reproduction device 10a is reflected on the watching/listening history information VH.

Further, the user does not always watch or listen to, in orderly sequence, even the content of a type, such as time-series data or array data, which is supposed to be watched or listened to in order from the starting position to the end position. For example, although having watched the content of a given moving image halfway by using the portable content reproduction device 10a, the user may wish to watch some scenes on a larger screen, and may again watch the content on the stationary content reproduction device 10b by returning to a position earlier than a position in which the reproduction was discontinued on the content reproduction device 10a. In this case, a reproduction discontinued position on the content reproduction device 10b can be a position closer to a starting point than a reproduction discontinued position on the content reproduction device 10a. In such a case, when the user further watches or listens to the content on the content reproduction device 10a, it is conceivable that the user may wish to resume the watching or listening not from the reproduction discontinued position on the content reproduction device 10b included in the last updated watching/listening history information VH but from the discontinued position at the time of the reproduction on the content reproduction device 10a.

In view of such a problem, in the content reproduction system 1 according to this embodiment, the watching/listening history management server 20 may retain a plurality of versions of the watching/listening history information VH for each combination of the user identification information UID and the content identification information CID. In this case, the watching/listening history information VH managed by the watching/listening history management server 20 further includes information indicating a version (herein, referred to as "version number") in addition to the information illustrated in FIG. 4. The version number is information used for distinguishing the plurality of pieces of the watching/listening history information VH, which are common in the user identification information UID and the content identification information CID, from one another, and each of the pieces of the watching/listening history information VH is managed with a combination of the user identification information UID, the content identification information CID, and the version number as a key. In other words, even when there is commonality in both the user identification information UID and the content identification information CID, if there is a difference in the version number, the plurality of pieces of the watching/listening history information VH may be retained in the watching/listening history management server 20.

Specifically, upon reception of the watching/listening history information VH from any one of the content reproduction devices 10, the watching/listening history management server 20 performs a search as to whether or not the watching/listening history information VH including the combination of the user identification information UID and the content identification information CID, which is common to the received watching/listening history information VH, is already stored in the storage unit 22. If stored, the watching/listening history management server 20 assigns a larger version number than the version number included in the most recent watching/listening history information VH among those pieces of the watching/listening history information VH to the newly received watching/listening history information VH, and stores the newly received watching/listening history information VH in the storage unit 22. At this time, the newly received watching/listening history information VH is stored as a separate piece of data from the watching/listening history information VH that is already stored in the watching/listening history management server 20 (in other words, the watching/listening history information VH is not overwritten). As a result, the watching/listening history management server 20 stores the plurality of pieces of the watching/listening history information VH that are common to one another in the user identification information UID and the content identification information CID and different from one another in the version number.

After that, if the acquisition request for the watching/listening history information VH is issued from any one of the content reproduction devices 10, the watching/listening history management server 20 transmits the watching/listening history information VH including the user identification information UID and the content identification information CID, which are included in the acquisition request, to the content reproduction device 10 being the requestor. At this time, the watching/listening history management server 20 does not necessarily transmit all the pieces of the watching/listening history information VH including the user identification information UID and the content identification information CID that are requested. For example, each content reproduction device 10 is configured to include the version number of the watching/listening history information VH, which is retained by itself at the current time point, in the acquisition request when transmitting the acquisition request for the watching/listening history information VH, and the watching/listening history management server 20 transmits only the watching/listening history information VH, which has a version number newer than the version number included in the acquisition request, to the content reproduction device 10 being the requestor. With this operation, while avoiding an increase in network traffic, each content reproduction device 10 can acquire the watching/listening history information VH of all the versions generated on the other content reproduction devices 10 in the past. Note that, here, each content reproduction device 10 retains, within the storage unit 12 of its own, the watching/listening history information VH that was generated by itself executing the content reproduction processing and transmitted to the watching/listening history management server 20 and the watching/listening history information VH that was generated on the content reproduction device 10 and acquired from the watching/listening history management server 20.

Further, the watching/listening history management server 20 may first transmit only the watching/listening history information VH of the most recent version in response to the acquisition request for the watching/listening history information VH. This is because it is normally conceivable that the user may often reproduce the content from the point subsequent to the state in which the content was the last watched or listened to, and hence it suffices to determine the state at the reproduction start time based on the discontinued state information RI included in the watching/listening history information VH of the most recent version. In this case, only when the acquisition request for the watching/listening history information VH of another version is particularly received, the watching/listening history management server 20 transmits the watching/listening history information VH of a version other than the most recent version to the content reproduction device 10 being the requestor.

If the plurality of pieces of the watching/listening history information VH of different versions are acquired from the watching/listening history management server 20 automatically or in accordance with the explicit instruction from the user, the content reproduction device 10 presents those pieces of information to the user in a list form, and receives a selection of the piece of the watching/listening history information VH used for determining the state of the content reproduction start time from the user. At this time, for example, the content reproduction device 10 may present not only the discontinued state indicated by the discontinued state information RI but also information related to the timing indicated by the last updated date and time information LU and the device identification information HID for identifying the content reproduction device 10 on which the content was last watched or listened to, to the user in the list form. Upon reception of the selection, the content reproduction processing section 41 starts the reproduction of the content from the state determined based on the discontinued state information RI included in the watching/listening history information VH of the selected version. This allows the user to watch or listen to one content by using the plurality of content reproduction devices 10 and, in a case where the reproduction was discontinued halfway on all thereof, select one of those plurality of discontinued states to watch or listen to the content from the point subsequent thereto.

Figure 7:
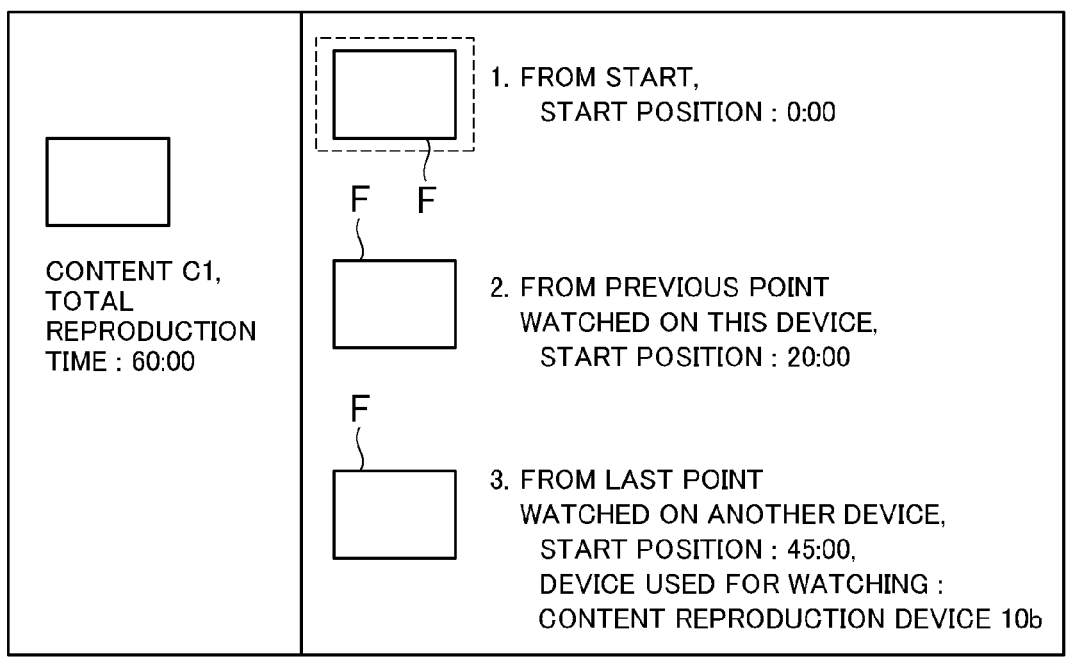
FIG. 7 A diagram illustrating an example of a menu screen presented to a user in order to receive a selection of a reproduction start position of the content.

FIG. 7 is a diagram illustrating an example of a menu screen presented to the user in order to receive a selection of a reproduction start position of the content from the user. Note that, FIG. 7 illustrates a display example of a case where, in the same order as the flow of FIG. 5, the reproduction processing of the content C1 of the moving image is executed on each of the first content reproduction device 10a and the second content reproduction device 10b and then the content C1 is again selected as the content to be reproduced by the user U1 on the first content reproduction device 10a. When the content C1 is selected as the content to be reproduced, the watching/listening history transmission/reception unit 42 of the first content reproduction device 10a acquires the pieces of the watching/listening history information VH of a plurality of versions related to the content C1 from the watching/listening history management server 20. Then, the content reproduction processing section 41 selects the piece of the watching/listening history information VH to be presented as the options to the user from among the acquired pieces of the watching/listening history information VH of the respective versions based on various selection criteria as described later. Then, the previous reproduction discontinued positions indicated by the details of the discontinued state information RI included in those selected respective pieces of watching/listening history information VH are displayed on the output unit 15 serving as a display device as the options for the reproduction start position to start the reproduction this time.

In this example of FIG. 7, the first content reproduction device 10a presents three options of "1. From the start", "2. From the previous point watched on this device", and "3. From the last point watched on another device" to the user as the options for the reproduction start position. In addition, a timestamp of the reproduction start position (information on an elapsed time since the starting position) and a frame image F in the reproduction start position (details of an image displayed at the time point of the previous discontinuation) are displayed together for each of the options. Further, a name of the content reproduction device 10 that records the reproduction start position as the discontinued state information RI (name of the content reproduction device 10 that performed the previous content reproduction until that reproduction start position) is displayed together for the third option.

Of the three options illustrated in FIG. 7, "1. From the start" is an option displayed by default irrespective of the presence/absence of the watching/listening history information VH or the details thereof, and corresponds to the reproduction from the starting position of the content. If there exist the pieces of the watching/listening history information VH including the device identification information HID on the content reproduction device 10 displaying this menu screen, "2. From the previous point watched on this device" is an option corresponding to the piece of the watching/listening history information VH in which the timing indicated by the last updated date and time information LU is most recent thereamong. Note that, here, the last updated date and time information LU is referenced to select the watching/listening history information VH of the option 2, but instead thereof or in addition thereto, an option corresponding to the watching/listening history information VH in which the timing indicated by the last reproduced date and time information LP is most recent among the pieces of the watching/listening history information VH including its own device identification information HID may be presented to the user. Even if the most recent watching/listening history information VH cannot be acquired due to inability to establish a communication connection to the watching/listening history management server 20, as long as the content reproduction device 10 retains the watching/listening history information VH generated by itself in the past in the storage unit 12, the content reproduction device 10 can present the second option to the user. In addition, "3. From the last point watched on another device" is an option corresponding to the piece of the watching/listening history information VH which includes the device identification information HID on a device other than itself, among the pieces of the watching/listening history information VH acquired from the watching/listening history management server 20, and in which the timing indicated by the last updated date and time information LU is most recent. Note that, in the same manner as in the example of the option 2, the option corresponding to the piece of the watching/listening history information VH in which the timing indicated not by the last updated date and time information LU but by the last reproduced date and time information LP is most recent among the pieces of the watching/listening history information VH including the device identification information HID on another content reproduction device 10 may be presented to the user. FIG. 7 illustrates an example of such a case as illustrated in FIG. 6B where the second content reproduction device 10b has reproduced the content C1 up to the position of forty-five minutes from the starting position. Note that, the third option may not be presented if the piece of the watching/listening history information VH in which the timing indicated by the last updated date and time information LU or the last reproduced date and time information LP is most recent among the pieces of the watching/listening history information VH acquired from the watching/listening history management server 20 includes the device identification information HID on itself (in this case, first content reproduction device 10a). The content reproduction processing section 41 references the discontinued state information RI included in the piece of the watching/listening history information VH corresponding to the option selected by the user from among those options to determine the reproduction start position, and starts the reproduction processing for the content.

Note that, the reproduction start positions presented as the options by the content reproduction device 10 are not limited to the ones described above. For example, the content reproduction device 10 may present as the option the reproduction start position farthest from the starting position (in other words, in a state in which the watching or listening has progressed furthest) among a plurality of reproduction start positions indicated by the pieces of the watching/listening history information VH of the plurality of versions. As a specific example, in a case where there exist three pieces of the watching/listening history information VH including pieces of the discontinued state information RI indicating that the reproduction was discontinued at time points when ten minutes, twenty-five minutes, and thirty minutes, respectively, had elapsed from the starting position, an option for starting the reproduction from the position of thirty minutes past the starting position is presented to the user.

Further, the content reproduction device 10 may classify the pieces of the watching/listening history information VH of the plurality of versions acquired for a given content in terms of the device identification information HID, and may present, for each of pieces of the device identification information HID, an option corresponding to the watching/listening history information VH in which the timing indicated by the last updated date and time information LU is most recent, the watching/listening history information VH in which the timing indicated by the last reproduced date and time information LP is most recent, or the watching/listening history information VH in which the reproduction start position is farthest from the starting position. In this case, for each of the plurality of content reproduction devices 10 used by the user, the position in which the reproduction was discontinued last time or the position in which the reproduction was discontinued when the content was watched or listened to up to a position closest to an end time point can be presented to the user as the option for the reproduction start position.

Note that, in the above description, the plurality of pieces of the watching/listening history information VH that are common in the user identification information UID and the content identification information CID are distinguished from one another by using the version number, but those plurality of pieces of the watching/listening history information VH may be distinguished from one another by using the device identification information HID. In this example, there is no need to use the version number, and the watching/listening history management server 20 manages the watching/listening history information VH with a combination of three pieces of information, i.e., the user identification information UID, the content identification information CID, and the device identification information HID as a key. In this case, even if the user identification information UID and the content identification information CID are common, as long as the device identification information HID is different, the watching/listening history management server 20 stores the piece of watching/listening history information VH separately in the storage unit 22. In contrast, if newly receiving the watching/listening history information VH whose user identification information UID, content identification information CID, and device identification information HID all match, the watching/listening history management server 20 overwrites the already stored watching/listening history information VH with the newly received watching/listening history information VH. With this operation, if a given user has watched or listened to a given content on each of N content reproduction devices 10, N pieces of the watching/listening history information VH corresponding to those content reproduction devices 10 are stored within the watching/listening history management server 20. This allows the user to watch or listen to the remaining part of the content that was watched or listened to on a specific content reproduction device 10 by selecting one state from among the states in which the watching or listening was last discontinued respectively on the plurality of content reproduction devices 10.

[Sharing Watching/Listening History Between Users]

In the above description, the watching/listening history information VH generated when one user watched or listened to the content is used only by this user, but the watching/listening history information VH may be used by another user of the content reproduction system 1.

As a specific example, a description is made of a case where the user U1 provides a user U2 with the watching/listening history information VH. For example, there is a case where the user U1 watches or listens to the content together with the user U2 by using the content reproduction device 10a owned by the user U1. In this case, the watching/listening history information VH including the user identification information UID of the user U1 being the owner of the content reproduction device 10a is generated within the content reproduction device 10a. Here, when the user U1 instructs to transmit the watching/listening history information VH by selecting the user U2 as a destination, the content reproduction device 10a transmits the watching/listening history information VH not only to the watching/listening history management server 20 but also to a message delivery server (not shown). The user U2, for example, uses a content reproduction device 10c owned by himself/herself to receive the watching/listening history information VH on the user U1 from the message delivery server. Then, the user U2 selects whether or not the watching/listening history information VH is to be received. If the user U2 selects that the watching/listening history information VH is to be received, the content reproduction device 10c replaces the user identification information UID of the user U1 included in the watching/listening history information VH with the user identification information UID on the user U2, and transmits the resultant to the watching/listening history management server 20. This allows the user U2 to reflect the watching/listening history of the content that was watched or listened to together with the other user U1 on the watching/listening history information VH managed by the watching/listening history management server 20 in the same manner as in the case where the user U2 watched or listened to the content by using the content reproduction device 10c owned by himself/herself. Then, after that, the user U2 can watch or listen to the remaining part of the content that was watched or listened to on the content reproduction device 10a, by using the watching/listening history information VH provided by the user U1, on the content reproduction device 10 owned by himself/herself (which is not limited to the content reproduction device 10c).

Note that, in the description made so far, the reproduction state at the time when the reproduction of the content was discontinued is included in the watching/listening history information VH as the discontinued state information RI, but in the case of providing another user with the watching/listening history information VH, the user who has watched or listened to the content may be allowed to arbitrarily change information of the reproduction state included in the discontinued state information RI. Alternatively, in addition to the discontinued state information RI, start state information indicating the reproduction state (such as reproduction start position of time-series data or array data) at the time point when the content reproduction processing section 41 started the content reproduction processing may be included in the watching/listening history information VH. If the content reproduction device 10 on the side provided with the watching/listening history information VH is configured to determine the reproduction start position and reproduction end position with reference to those information pieces, the user can allow another user to watch or listen to a particular part within the content that was watched or listened to by himself/herself or that the user wishes another user to watch or listen to.

Further, the watching/listening history information VH on each of the users managed within the watching/listening history management server 20 may be made public also to other users satisfying a condition set in advance. For example, in a case where one content reproduction device 10 is used by a plurality of users, such as a case where a family share one content reproduction device 10, of those plurality of users, some users may be set as master accounts, while the other users may be set as sub-accounts. Here, the sub-account is an account with a limitation placed on partial use of the content reproduction device 10, which is set, for example, when a person under age uses the content reproduction device 10. In this case, in response to a request made by the user of the master account, the watching/listening history management server 20 may provide the user of the master account with the watching/listening history information VH on the content that was watched or listened to by the user of the sub-account.

Further, the plurality of users using the content reproduction system 1 may be provided with a service of a so-called social network type. In this case, a relationship as a friend is set between respective users. Then, each of the users may be allowed to view the watching/listening history information VH on the user set as his/her friend or set as a friend of his/her friend. Such a service can also be used for a recommendation service for contents with respect to the user. In other words, the watching/listening history information VH managed by the watching/listening history management server 20 may be used to present, to each of the users, a content that has been watched or listened to by another user (for example, user set as the user's friend or another user who has watched or listened to the same content as the content that was watched or listened to by the user) as a content recommended to the each of the users.

Note that, in the above description, all the content reproduction devices 10 directly access the watching/listening history management server 20, but a program for transmitting and receiving the watching/listening history information VH to and from the watching/listening history management server 20 may not be implemented on some of the content reproduction devices 10 such as a portable audio player or home-use television set. In this case, if those content reproduction devices 10 are provided with a function for performing communication with another server such as a home server, by using such a server as a gateway server, those content reproduction device 10 can also exchange the watching/listening history information VH with the watching/listening history management server 20.

Further, in the above description, the discontinued state information RI included in the watching/listening history information VH is generated by the content reproduction processing section 41 upon reception of the discontinuation instruction for the content reproduction processing issued by the user. However, a method of generating the discontinued state information RI is not limited to the above-mentioned one. For example, the content reproduction processing section 41 may perform processing for recording the reproduction state of the content at the present time point repeatedly at short periods during the content reproduction processing. With this operation, the information indicating the reproduction state that was last recorded when the content reproduction processing was discontinued can be used as the discontinued state information RI indicating the reproduction state of the content at the time of the discontinuation. Further, instead of the content reproduction processing section 41, the watching/listening history transmission/reception unit 42 may monitor a state of the reproduction processing performed by the content reproduction processing section 41 every predetermined time, and may transmit information obtained by the monitoring to the watching/listening history management server 20 as the discontinued state information RI. According to such processing, for example, even if an abnormal end occurred in the content reproduction processing without depending on the instruction from the user because the content reproduction device 10 ran out of battery or other such cause, the discontinued state information RI indicating the reproduction state at that time can be recorded and transmitted to the watching/listening history management server 20.

Further, in the above description, each content reproduction device 10 always acquires the watching/listening history information VH generated by another content reproduction device 10 via the watching/listening history management server 20, but each content reproduction device 10 may acquire the watching/listening history information VH directly from another content reproduction device 10 in some cases. Specifically, for example, by receiving an instruction from the user, the content reproduction device 10 transmits the watching/listening history information VH on the content specified by the user directly to another content reproduction device 10 specified by the user. Accordingly, the users can share the watching/listening history information VH by connecting their own content reproduction devices 10 directly to each other in a wired or wireless manner even in a case where the watching/listening history management server 20 is inactive or a case where a communication connection to the watching/listening history management server 20 cannot be established.

The invention claimed is:

1. A content reproduction device, comprising:
at least one processor for executing computer instructions, wherein the computer instructions comprise:
a communication unit configured to communicate with a watching/listening history management server over a network;
a content reproduction unit configured to reproduce a content;
a discontinued state information transmission unit configured to transmit, when reproduction of the content is discontinued, discontinued state information indicating: (i) a reproduction state of the content at a time point of the discontinuation to the watching/listening history management server, (ii) device identification information for uniquely identifying the content reproduction device or another content reproduction device upon which the reproduction of the content was discontinued, and (iii) user identification information for uniquely identifying a specific user of the content reproduction device identified by the device identification information; and
a discontinued state information reception unit configured to receive the discontinued state information stored in the watching/listening history management server from the watching/listening history management server,
wherein the content reproduction unit presents to the user the device identification information identifying the content reproduction device or the other content reproduction device upon which the reproduction of the content was discontinued, and
wherein the content reproduction unit starts the reproduction of the content from a state determined based on the received discontinued state information.

2. The content reproduction device according to claim 1, wherein:
the discontinued state information transmission unit transmits the discontinued state information to the watching/listening history management server in association with identification information on a user of the content reproduction device; and
the discontinued state information reception unit receives the discontinued state information associated with the identification information on the user of the content reproduction device from the watching/listening history management server.

3. The content reproduction device according to claim 2, wherein:
the discontinued state information reception unit receives a plurality of pieces of the discontinued state information, which are stored in the watching/listening history management server and which are common in the user and the content, from the watching/listening history management server; and
the content reproduction unit starts the reproduction of the content from a state determined based on a piece of the discontinued state information selected from among the received plurality of pieces of the discontinued state information.

4. The content reproduction device according to claim 3, wherein the content reproduction unit presents, to the user as options, a plurality of pieces of the discontinued state information selected from among the received plurality of pieces of the discontinued state information based on a predetermined selection condition, and starts the reproduction of the content from a state determined based on a piece of the discontinued state information selected from among the options presented to the user.

5. The content reproduction device according to claim 4, wherein:
the discontinued state information transmission unit transmits the discontinued state information to the watching/listening history management server in association with identification information on the content reproduction device; and
the content reproduction unit presents, as one of the options, each of a plurality of pieces of the discontinued state information associated with mutually different pieces of identification information on content reproduction devices among the received plurality of pieces of the discontinued state information.

6. The content reproduction device according to claim 4, wherein the content reproduction unit selects, as one of the options, a piece of the discontinued state information corresponding to the reproduction of the content last executed by the content reproduction means, which is used as the predetermined selection condition.

7. The content reproduction device according to claim 4, wherein the content reproduction unit selects, as one of the options, a piece of the discontinued state information corresponding to the reproduction of the content which is last executed, from among the received plurality of pieces of the discontinued state information, which is used as the predetermined selection condition.

8. The content reproduction device according to claim 4, wherein:
the content is time-series data that is sequentially reproduced from a starting position to an end position with a lapse of time; and
the content reproduction unit selects, as one of the options, a piece of the discontinued state information indicating that the content was reproduced up to a position farthest from the starting position from among the received plurality of pieces of the discontinued state information, which is used as the predetermined selection condition.

9. A content reproduction system, comprising:
a plurality of content reproduction devices; and
a watching/listening history management server, wherein:
each of the plurality of content reproduction devices comprises at least one processor executing computer instructions, wherein the computer instructions comprise:
a communication unit configured to communicate with the watching/listening history management server over a network;
a content reproduction unit configured to reproduce a content; and
a discontinued state information transmission unit configured to transmit, when reproduction of the content is discontinued, discontinued state information indicating: (i) a reproduction state of the content at a time point of the discontinuation to the watching/listening history management server, (ii) device identification information for uniquely identifying the content reproduction device or another content reproduction device upon which the reproduction of the content was discontinued, and (iii) user identification information for uniquely identifying a specific user of the content reproduction device identified by the device identification information;
the watching/listening history management server comprises a storage unit configured to store the discontinued state information received from the each of the plurality of content reproduction devices;
the each of the plurality of content reproduction devices further comprises discontinued state information reception unit configured to receive the discontinued state information from the watching/listening history management server;
the content reproduction unit presents to the user the device identification information identifying the content reproduction device upon which the reproduction of the content was discontinued, and
the content reproduction unit starts the reproduction of the content from a state determined based on the received discontinued state information.

10. A content reproduction method, which uses a content reproduction device to be connected to a watching/listening history management server, comprising the steps of:
reproducing a content;
transmitting, when reproduction of the content is discontinued, discontinued state information indicating: (i) a reproduction state of the content at a time point of the discontinuation to the watching/listening history management server, (ii) device identification information for uniquely identifying the content reproduction device or another content reproduction device upon which the reproduction of the content was discontinued, and (iii) user identification information for uniquely identifying a specific user of the content reproduction device identified by the device identification information; and
receiving the discontinued state information stored in the watching/listening history management server from the watching/listening history management server,
wherein the step of reproducing a content includes presenting to the user the device identification information identifying the content reproduction device or the other content reproduction device upon which the reproduction of the content was discontinued, and
wherein the step of reproducing a content comprises starting the reproduction of the content from a state determined based on the received discontinued state information.

11. A non-transitory, computer-readable information storage medium having a program stored thereon for causing a computer to function as:
a communication unit configured to communicate with a watching/listening history management server over a network;
a content reproduction unit configured to reproduce a content;
a discontinued state information transmission unit configured to transmit, when reproduction of the content is discontinued, discontinued state information indicating: (i) a reproduction state of the content at a time point of the discontinuation to the watching/listening history management server, (ii) device identification information for uniquely identifying the content reproduction device or another content reproduction device upon which the reproduction of the content was discontinued, and (iii) user identification information for uniquely identifying a specific user of the content reproduction device identified by the device identification information; and
a discontinued state information reception unit configured to receive the discontinued state information stored in the watching/listening history management server from the watching/listening history management server,
wherein the content reproduction unit presents to the user the device identification information identifying the content reproduction device or the other content reproduction device upon which the reproduction of the content was discontinued, and
wherein the content reproduction unit starts the reproduction of the content from a state determined based on the received discontinued state information.

* * * * *